United States Patent
Montoya

(10) Patent No.: US 9,651,440 B2
(45) Date of Patent: May 16, 2017

(54) PASSIVE PRESSURE SENSING USING SENSOR WITH DIAPHRAGM SEPARATOR

(71) Applicant: James Daniel Montoya, Santa Fe, NM (US)

(72) Inventor: James Daniel Montoya, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 273 days.

(21) Appl. No.: 14/532,847

(22) Filed: Nov. 4, 2014

(65) Prior Publication Data

US 2015/0160084 A1 Jun. 11, 2015

Related U.S. Application Data

(63) Continuation of application No. PCT/US2014/063219, filed on Oct. 30, 2014.

(60) Provisional application No. 61/913,039, filed on Dec. 6, 2013.

(51) Int. Cl.
| | | |
|---|---|---|
| *G01L 11/00* | (2006.01) | |
| *G01L 7/08* | (2006.01) | |
| *G01L 9/00* | (2006.01) | |
| *G01L 19/00* | (2006.01) | |
| *G01L 19/06* | (2006.01) | |
| *G01L 19/14* | (2006.01) | |

(52) U.S. Cl.
CPC ........ *G01L 9/0022* (2013.01); *G01L 19/0023* (2013.01); *G01L 19/0038* (2013.01); *G01L 19/0645* (2013.01); *G01L 19/143* (2013.01)

(58) Field of Classification Search
CPC ..... G01H 11/02; G01L 23/222; G01L 23/223; G01L 9/0022; G01L 9/007; G01L 23/12; G01L 9/10; Y10T 29/4902; Y10T 29/49877
USPC ............. 73/723, 703–704, 715, 35.09, 35.11
See application file for complete search history.

(56) References Cited

U.S. PATENT DOCUMENTS

| | | | |
|---|---|---|---|
| 4,409,816 A | 10/1983 | Yamaguchi | |
| 4,680,970 A | 7/1987 | Ueda | |
| 7,398,690 B1 | 7/2008 | Erickson | |
| 2002/0062696 A1 | 5/2002 | Burczyk | |
| 2008/0223140 A1* | 9/2008 | Broden | ............... G01L 19/0046 73/718 |

(Continued)

FOREIGN PATENT DOCUMENTS

| | | |
|---|---|---|
| GB | 2209219 | 5/1989 |
| JP | S61194325 | 8/1986 |

OTHER PUBLICATIONS

International Search Report for PCT/US2014/063219, mailed Feb. 2, 2015.

*Primary Examiner* — Harshad R Patel
*Assistant Examiner* — Brandi Hopkins
(74) *Attorney, Agent, or Firm* — King & Spalding LLP

(57) ABSTRACT

A pressure sensor for sensing pressure of a fluid includes a diaphragm separator having a protrusion. The pressure sensor further includes a resonator, where the protrusion is in contact with the resonator on a first side of the resonator. The protrusion is positioned to exert an imparted force onto the resonator. The pressure sensor also includes a backing diaphragm positioned on a second side of the resonator. The backing diaphragm exerts a counter force onto the resonator in response to the imparted force.

20 Claims, 12 Drawing Sheets

(56) References Cited

U.S. PATENT DOCUMENTS

2012/0096945 A1  4/2012  Sato

* cited by examiner

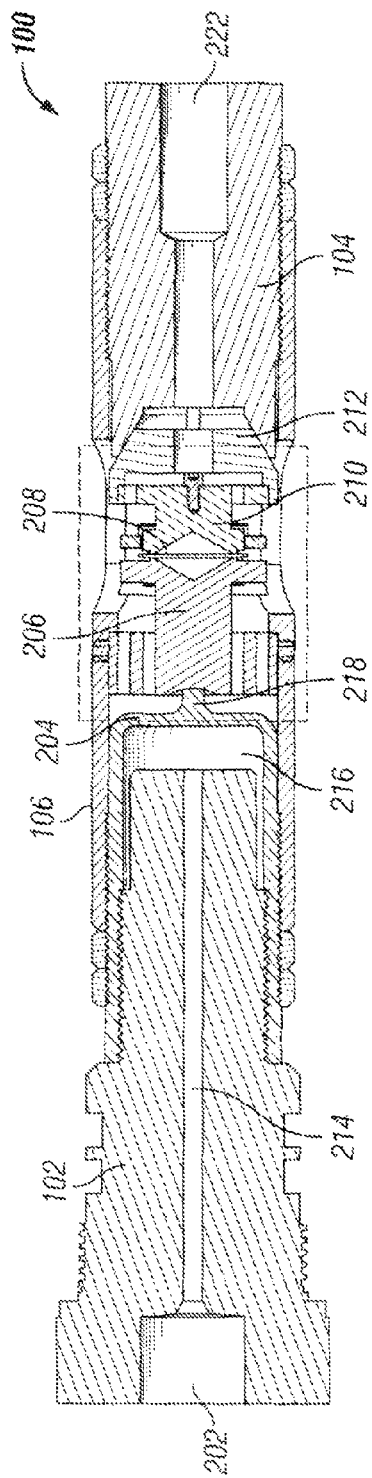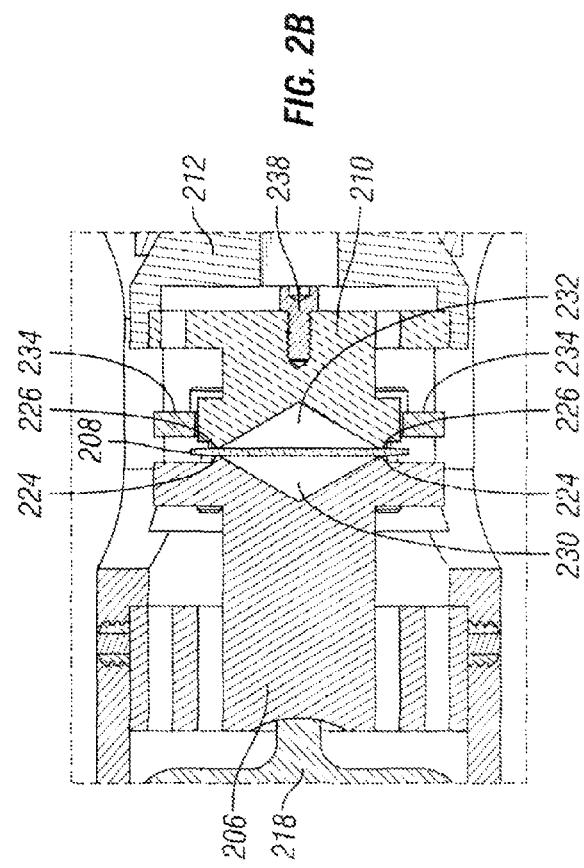

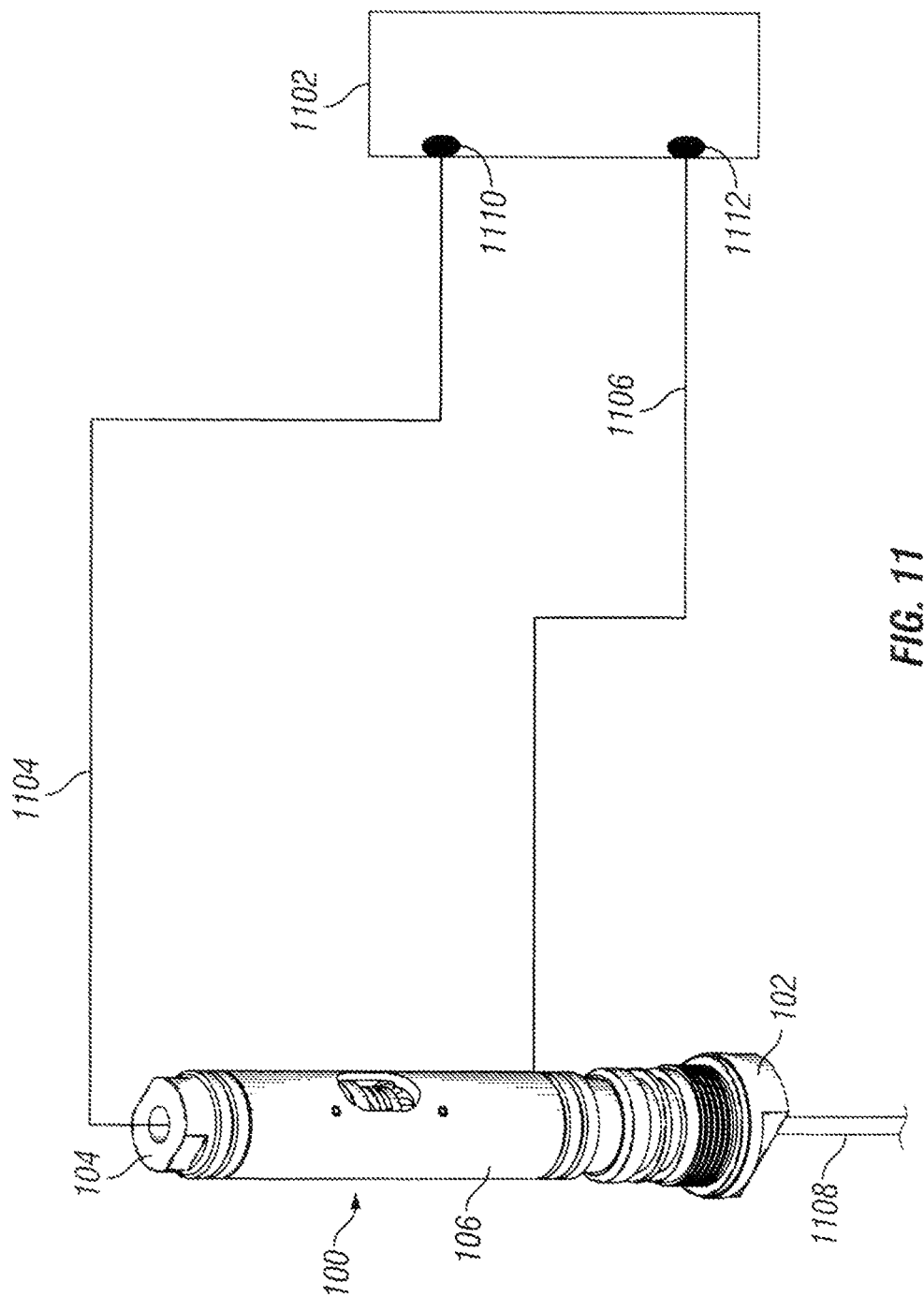

PASSIVE PRESSURE SENSING USING SENSOR WITH DIAPHRAGM SEPARATOR

CROSS-REFERENCE TO RELATED APPLICATIONS

The present application claims priority to and is a continuation of International Application No. PCT/US14/63219, filed Oct. 30, 2014, and titled "Passive Pressure Sensing," which claims priority to U.S. Provisional Patent Application No. 61/913,039, filed Dec. 6, 2013, and titled "Passive Pressure Sensing," the entire contents of which are incorporated herein by reference.

TECHNICAL FIELD

The present disclosure relates generally to pressure sensing and more particularly to pressure sensing using a piezoelectric pressure transducer.

BACKGROUND

Pressure sensors (also commonly known as pressure transducers) are often used for sensing fluid pressure in applications such as oil and gas production. For example, a fluid that is monitored for pressure may apply fluid pressure on a pressure sensor, and the pressure sensor may sense the fluid pressure and generate, for example, a signal indicative of the applied fluid pressure. Some existing pressure sensors may include one or more resonators to sense fluid pressure. Generally, active electronic components are often used along with the resonators to sense the fluid pressure. However, due to the relatively low temperature tolerance of active electronic components, pressure sensors that employ active electronic components may have limited use in relatively high temperature environments. Thus, some pressure sensors that include active electronic components may have reliability issues compared to a pressure sensor that uses only passive components that are exposed to a harsh environment. Further, a pressure sensor that includes active electronic components may be relatively more expensive than a pressure sensor that uses only passive components.

Accordingly, a pressure sensor that can sense fluid pressure, for example, in an oil well using a resonator and without active components that are exposed to a harsh environment is desirable.

SUMMARY

The present disclosure relates generally to pressure sensing using a piezoelectric pressure transducer. For example, a pressure sensor may include a diaphragm separator that is exposed to a fluid pressure. The diaphragm separator may exert an imparted force proportional to the fluid pressure onto a resonator. The imparted force exerted onto a piezoelectric resonator causes a frequency change in the piezoelectric resonator that is directly proportional to the imparted force and thus to the fluid pressure.

In an example embodiment, a pressure sensor for sensing pressure of a fluid includes a diaphragm separator having a protrusion. The pressure sensor further includes a resonator, where the protrusion is in contact with the resonator on a first side of the resonator. The protrusion is positioned to exert an imparted force onto the resonator. The pressure sensor also includes a backing diaphragm positioned on a second side of the resonator. The backing diaphragm exerts a counter force onto the resonator in response to the imparted force.

In another example embodiment, a system for measuring a pressure of a fluid includes a signal source, a signal receiver, and a pressure sensor. The pressure sensor includes a diaphragm separator having a protrusion. The pressure sensor further includes a resonator, where the protrusion is in contact with the resonator on a first side of the resonator. The protrusion is positioned to exert an imparted force onto the resonator. The pressure sensor also includes a backing diaphragm positioned on a second side of the resonator. The backing diaphragm exerts a counter force onto the resonator in response to the imparted force.

In another example embodiment, a method for measuring a pressure of a fluid includes generating a signal by a signal source, receiving the signal by a signal receiver through a pressure sensor, and processing the signal to determine the pressure sensed by the pressure sensor. The pressure sensor includes a diaphragm separator having a protrusion. The pressure sensor further includes a resonator, where the protrusion is in contact with the resonator on a first side of the resonator. The protrusion is positioned to exert an imparted force onto the resonator. The pressure sensor also includes a backing diaphragm positioned on a second side of the resonator, where the backing diaphragm exerts a counter force onto the resonator in response to the imparted force. Receiving the signal through the pressure sensor includes receiving the signal through the resonator.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIG. 2A illustrates a longitudinal cross-section of the pressure sensor of FIG. 1 in accordance with an example embodiment;

FIG. 2B illustrates a close-up view of a portion of the longitudinal cross-section illustrated in FIG. 2A in accordance with an example embodiment;

FIG. 11 illustrates a system for measuring a pressure of a fluid using the pressure sensor of FIG. 1 in accordance with an example embodiment.

Figure 1:
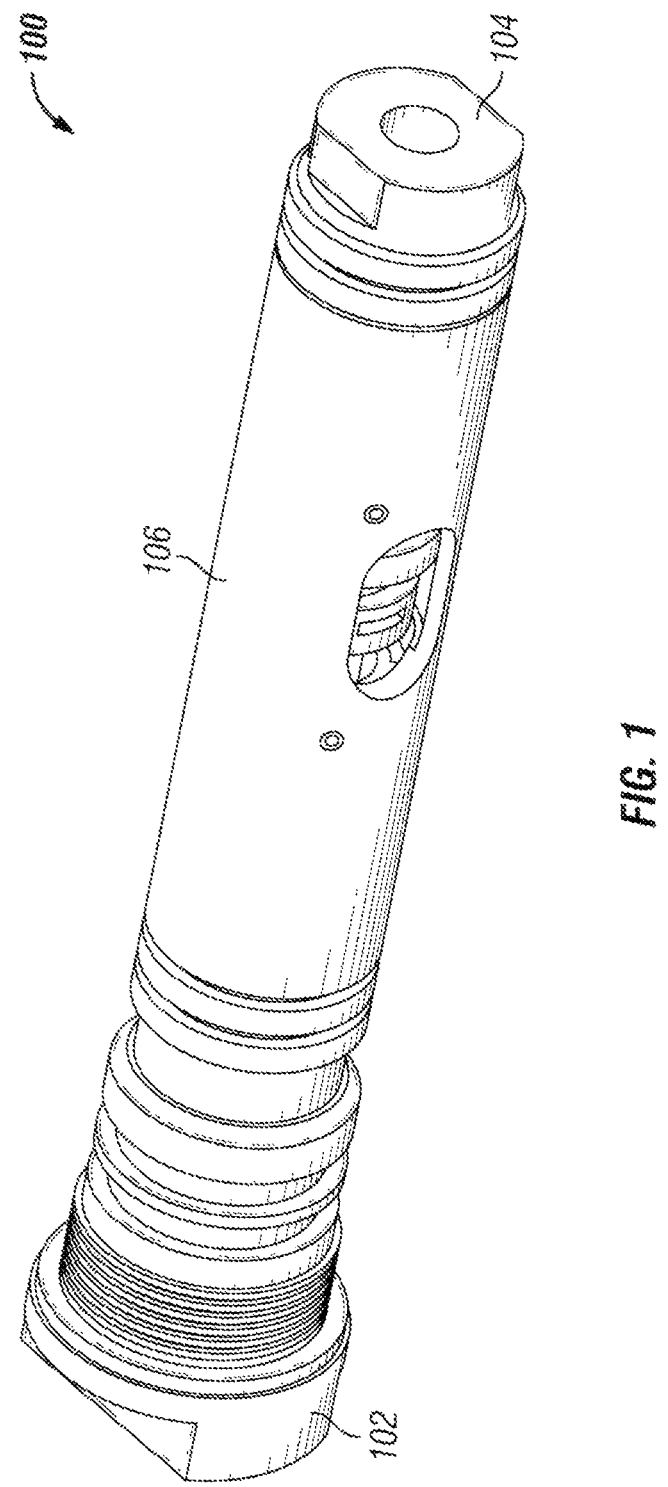
FIG. 1 is a perspective view of a pressure sensor for sensing a pressure of a fluid in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a perspective view of a pressure sensor 100 for sensing a pressure of a fluid according to an example embodiment. The pressure sensor 100 operates by associating pressure exerted by a fluid ("outside fluid") that is outside of the pressure sensor 100 to a resonance frequency of a resonator of the pressure sensor 100. In some example embodiments, the pressure sensor 100 may be placed in the annulus portion of a well between the casing and the production tubing of a wellbore. The pressure sensor 100 is configured to sense a wide range of fluid pressure levels over a wide range of temperature conditions. In some example embodiments, the pressure sensor 100 is configured to operate in an environment having a temperature that ranges from below 32° F. (gas pressure measurements) to over 600 degrees Fahrenheit. In some example embodiments, the pressure sensor may also sense pressure levels ranging from 0 pound per square inch (PSI) to over 10,000 PSI.

In some example embodiments, the pressure sensor 100 includes a pressure head 102, a housing 106, and a backing plug 104. As illustrated in FIG. 1, the housing 106 may be a tubular housing. For example, the pressure head 102 and the backing plug 104 may be threaded to mate with internally threaded portions at respective ends of the housing 106. Alternatively, the pressure head 102 and the backing plug 104 may be securely attached to the housing 106 by other means such as fasteners and soldering/brazing/welding. In some example embodiments, the length of the pressure sensor 100 inclusive of the pressure head 102, the housing 106 and the backing plug 104 may be less than 7 inches, and the height of the pressure sensor 100 may be approximately 1 inch. In alternative embodiments, the pressure sensor 100 may be much larger or smaller than 7 inches in length, and may be larger or smaller than 1 inch in height.

As described in more detail below, the pressure head 102 may include a fluid inlet that may be coupled to a pipe that connects the pressure sensor 100 to the outside fluid to be monitored for pressure. For example, the pipe may be coupled to a structure that isolates pressure sensor 100 from the outside fluid. Alternatively, the pressure sensor 100 may be enclosed in an outer housing or sleeve (not shown) that protects the pressure sensor 100 from exposure to the outside fluid. To illustrate, the fluid inlet of the pressure head 102 may be exposed to the outside fluid, and the pressure sensor 100 may sense the pressure of the fluid through the fluid inlet.

As described in more detail below, the pressure sensor 100 includes a resonator that oscillates at a frequency that depends on the amount load applied to a resonator. A load that is fractionally proportional to the fluid pressure is exerted onto the resonator in the pressure sensor 100. By applying a load that is fractionally proportional to the fluid pressure onto the resonator, the integrity of the resonator can be maintained. The relationship between the fluid pressure and the load exerted onto the resonator can be used to associate a resonance frequency of the resonator to the fluid pressure. To illustrate, because the resonance frequency of the resonator is dependent on the load exerted on the resonator, and because the load exerted onto the resonator is proportional to the fluid pressure, the resonance frequency of the resonator may be used to determine the fluid pressure.

Referring to FIGS. 2A and 2B, FIG. 2A illustrates a longitudinal cross-section of the pressure sensor 100 of FIG. 1 in accordance with an example embodiment. As illustrated in FIG. 2A, the pressure sensor 100 includes the pressure head 102, the backing plug 104, and the housing 106. The pressure sensor 100 further includes a diaphragm separator 204, a first (front) diaphragm flexure 206, a resonator 208, and a second (rear) diaphragm flexure 210. The diaphragm separator 204 is positioned on a first side of the first diaphragm flexure 206. The first diaphragm flexure 206 is positioned between the diaphragm separator 204 and the resonator 208 on a first side of the resonator 208. The second diaphragm flexure 210 is positioned on a second side of the resonator 208. In some example embodiments, the pressure sensor 100 includes an electrical insulator 212 partially positioned between the diaphragm flexure 210 and the backing plug 104.

In some example embodiments, the diaphragm separator 204, the diaphragm flexure 206, the resonator 208, and the diaphragm flexure 210 are in physical contact with the respective adjacent components. To illustrate, the diaphragm separator 204 is in contact with the first diaphragm flexure 206, the first diaphragm flexure 206 is in contact with the resonator 208, and the resonator 208 is in contact with the second diaphragm flexure 210. In certain example embodiments, a protrusion 218 of the diaphragm separator 204 can extend into the first diaphragm flexure 206 and may be in contact with the first diaphragm flexure 206.

In some example embodiments, each of the diaphragm separator 204, the diaphragm flexure 206, and the diaphragm flexure 210 may be made from steel, such as stainless steel. Further, the housing 106 and the backing plug 104 may also be made from steel or another electrically conductive material. In some example embodiments, the resonator 208 may be a quartz resonator, such as a high frequency, thickness-shear-mode disc quartz resonator. The diaphragm flexure 206 may be electrically coupled to a terminal of the resonator 208, and the diaphragm flexure 210 may similarly be electrically coupled to another (opposite polarity) terminal of the resonator 208.

As illustrated in FIG. 2A, the diaphragm separator 204, the first diaphragm flexure 206, the resonator 208, the second diaphragm 210, and at least a portion of the pressure head 102 are positioned within the housing 106. For example, the diaphragm separator 204 may be attached to the housing 106 by mating threads and/or by other means. As an example of other means, the diaphragm separator 204 and the housing 106 may be soldered together. A portion of the diaphragm separator 204 may move laterally toward the diaphragm flexure 206 in response to fluid pressure applied to the diaphragm separator 204.

In some example embodiments, the diaphragm flexure 206 may be attached to the housing 106 at the edge portions of the diaphragm flexure 206 such that a middle portion of the diaphragm flexure 206 can move laterally in response to pressure applied to the diaphragm flexure 206 by the diaphragm separator 204. Because the housing 106 and the diaphragm flexure 206 may be made from an electrically conductive material, the housing 106 and the diaphragm flexure 206 may be electrically coupled to each other. Further, because a terminal of the resonator 208 may be coupled to the diaphragm flexure 206 as explained above, the particular terminal of the resonator 208 is also electrically coupled to the housing 106 through the diaphragm flexure 206. In some example embodiments, the housing 106 may be coupled to a casing (e.g., conductive pipe) of a wellbore that is electrically isolated from a production tubing (e.g., a smaller conductive pipe) that the casing surrounds. For example, the casing may be coupled to a signal source or receiver that may be above ground.

In some example embodiments, the resonator 208 may be attached directly or indirectly to the housing 106 at the edge portions of the resonator 208. For example, the resonator 208 may oscillate at a particular resonance frequency in response to force applied onto the resonator 208 by the diaphragm flexure 206. Unlike the diaphragm flexure 206, the attachment of the resonator 208 to the housing 106 may not electrically couple the resonator 208 to the housing 106, for example, because a non-conductive portion of the resonator 208 may be coupled to the housing 106.

In some example embodiments, the diaphragm flexure 210 may be attached to the electrical insulator 212 at the edge portions of the diaphragm flexure 210. A middle portion of the diaphragm flexure 210 that is between the edge portions of the diaphragm flexure 206 may move laterally (e.g., in a direction toward or away from the backing plug 104) in response to the load exerted on resonator 208 by the diaphragm flexure 206. For example, the diaphragm flexure 210 may exert a counter force onto the resonator 208 and thereby reduce the risk of damage to the resonator 208 from the load exerted onto the resonator 208 by the diaphragm flexure 206. To illustrate, the electrical insulator 212 may be fixedly attached to the housing 106 and can retain the edge portions of the diaphragm flexure 210 in a substantially fixed position to enable the middle portion of the diaphragm flexure 210 to move laterally. The electrical insulator 212, which, for example, may be made from ceramic, is positioned to electrically isolate the diaphragm flexure 210 from the housing 106.

The backing plug 104 is positioned adjacent to the electrical insulator 212 and may serve to retain the resonator 208 and the electrical insulator 212 within the housing 106. As illustrated in FIG. 2A, the backing plug 104 may be coupled to the housing 106 by mating threads. Alternatively or in addition, the backing plug 104 may be coupled to the housing 106 by other means including fasteners and/or soldering/brazing/welding. In some example embodiments, the backing plug 104 may include a passageway 222 that is used to route, for example, one or more electrical wires (not shown) to the diaphragm flexure 210. For example, the wires may electrically couple the diaphragm flexure 210 to a production tubing (e.g., a steel pipe) of an oil well that may be used to carry a signal between the pressure sensor 100 and, for example, a signal source/receiver that may be above ground.

In some example embodiments, the pressure head 102 includes a fluid inlet 202 and a channel 214 extending between the fluid inlet 202 and a chamber 216. As illustrated in FIG. 2A, the chamber 216 is partially bounded by the diaphragm separator 204. For example, the chamber 216 may contain an isolation fluid that is separated by a structure (for example, a bellows) from the outside fluid that is monitored for pressure. To illustrate, the fluid in the chamber 216 may be a hydraulic fluid. The fluid contained in the chamber 216 may exert fluid pressure on the diaphragm separator 204. For example, the amount of fluid pressure exerted on the diaphragm separator 204 by the fluid contained in the chamber 216 may be substantially the same amount of pressure exerted by the outside fluid that the pressure sensor 100 is used sense. In some alternative embodiments, the chamber 216 may contain the outside fluid instead of the isolation fluid without a separator that isolates the chamber 216 from the outside fluid.

As illustrated in FIG. 2A, the diaphragm separator 204 is positioned to isolate the diaphragm flexure 206, the resonator 208, and the diaphragm flexure 210 from the fluid contained in the chamber 216. The load exerted on the resonator 208 is proportional to the fluid pressure exerted on the diaphragm separator 204 by the fluid in the chamber 216. To illustrate, the diaphragm separator 204 is designed to exert imparted force on the diaphragm flexure 206, and the diaphragm flexure 206 is designed to exert a load that is a portion of the imparted force onto the resonator 208. For example, the imparted force exerted on the diaphragm flexure 206 by the diaphragm separator 204 may be proportional to the fluid pressure exerted on the diaphragm separator 204 by the fluid contained in the chamber 216. In some example embodiments, the imparted force exerted on the diaphragm flexure 206 may depend on the thickness of the diaphragm flexure 206, and the load exerted on the resonator 208 may depend on the thickness of the diaphragm flexure 206 and on the thickness of the diaphragm flexure 210.

In some example embodiments, when the chamber 216 contains an isolation fluid, a pipe (e.g., a pipe 1108 shown in FIG. 11) that is attached to the fluid inlet 202 may contain the same isolation fluid and may serve as a passageway to transfer pressure from the outside fluid to the isolation fluid in the chamber 216. For example, the pressure of the outside fluid can be transferred to the isolation fluid in the chamber 216 through the isolation fluid in the pipe and in the channel 214. Although a single channel and a single fluid inlet are shown in FIG. 2A, in alternative embodiments, the pressure head 102 may include multiple channels and/or multiple fluid inlets. Further, in alternative embodiments, the pressure head 102 may include multiple chambers that are partially bounded by the diaphragm separator 204.

To determine fluid pressure exerted by the outside fluid, a reference resonance frequency of the resonator 208 may first be determined based on a known amount of pressure exerted by the isolation fluid in the chamber 216. After the reference resonance frequency of the resonator 208 is determined, a new resonance frequency of the resonator 208 resulting from a change in the load exerted on the resonator 208 may be used to determine the pressure exerted by the fluid contained in the chamber 216. Because the resonance frequency of the resonator 208 is dependent on the load exerted on the resonator 208, the relationship between the fluid pressure exerted on the diaphragm separator 204 by the isolation fluid in the chamber 216, the imparted force exerted on the diaphragm flexure 206 by the diaphragm separator 204, and the load exerted on the resonator 208 by the diaphragm flexure 206 (i.e., the portion of the imparted force exerted on the diaphragm flexure 206) can be used to associate a new resonance frequency of the resonator 208 to the fluid pressure.

FIG. 2B illustrates a close-up view of a portion of the longitudinal cross-section illustrated in FIG. 2A in accordance with an example embodiment. As illustrated in FIG. 2B, the resonator 208 may be at least partially retained by structures 234 within the housing 106. The diaphragm flexure 206 is in contact with edge portions 224 of the resonator 208 on one side of the resonator 208. In some example embodiments, the load exerted on the resonator 208 by the diaphragm flexure 206 is exerted through the physical contact at the edge portions 224. The diaphragm flexure 206 may also be electrically coupled to a terminal of the resonator 208 at the edge portions 224. Similarly, the diaphragm flexure 210 is in contact with edge portions 226 of the resonator 208 on the opposite side of the resonator 208 applies a counter force on the resonator 208. The diaphragm flexure 210 may also be electrically coupled to another terminal of the resonator 208 at the edge portions 226.

In some example embodiments, the pressure sensor 100 includes a space 230 between the diaphragm flexure 206 and the resonator 208, which, in FIGS. 2A and 2B, may be a relatively high frequency resonator such as a quartz resonator. The pressure sensor 100 also includes a space 232 between the resonator 208 and the diaphragm flexure 210. The space 230 and 232 enable the resonator 208 to oscillate laterally. Further, the space 230 provides an area for a lateral movement of the middle portion of the diaphragm flexure 206 toward the resonator 208 without contacting the middle portion of the resonator 208 between the edge portions 224. Similarly, the space 232 provides an area for a lateral movement of the middle portion of the diaphragm flexure 210 toward the resonator 208 without contacting the middle portion of the resonator 208 between the edge portions 226.

In some example embodiments, the diaphragm flexure 210 may include an attachment hole 238 that is designed for making an electrical connection (e.g., one or more wires) to the diaphragm flexure 210. For example, the attachment hole 238 may be a threaded hole for securing one or more wires for example by a threaded component. As explained above, the diaphragm flexure 210 is electrically isolated from the housing 106 by the insulator 212. Thus, an electrical connection from one of the terminals of the resonator 208 coupled to the diaphragm flexure 210 and the electrical connection attached to the attachment hole 238 is made through the diaphragm flexure 210. As explained above, the diaphragm flexure 206, which is connected to a terminal of the resonator 208, is electrically connected to (i.e., in electrical communication with) the housing 106. Thus, an electrical signal may be provided to or received from the resonator 208 through the housing or through one or more wires that may be coupled to the diaphragm flexure 210 at the attachment hole 238. In some example embodiments, the housing 106 and the diaphragm flexure 206 may be at an electrical ground voltage level, and the diaphragm flexure 210 may be used to carry an electrical signal between the resonator 208 and a signal receiver that is electrically coupled to the diaphragm flexure 210.

By using metal and ceramic components and by eliminating the placement of active electronic components within the pressure sensor 100, the pressure sensor 100 allows pressure sensing to be performed, for example, in relatively high temperature environments. Further, the pressure sensor 100 may be produced more cost effectively than pressure sensors that include generally more costly active components.

Although the pressure sensor 100 of FIGS. 2A and 2B is described as including the diaphragm flexure 206, in some alternative embodiments, the diaphragm flexure 206 may be omitted and the diaphragm separator 204 may be in contact with the resonator 208 without an intermediate reduction of the imparted force exerted by the diaphragm separator 204.

Figure 3A:
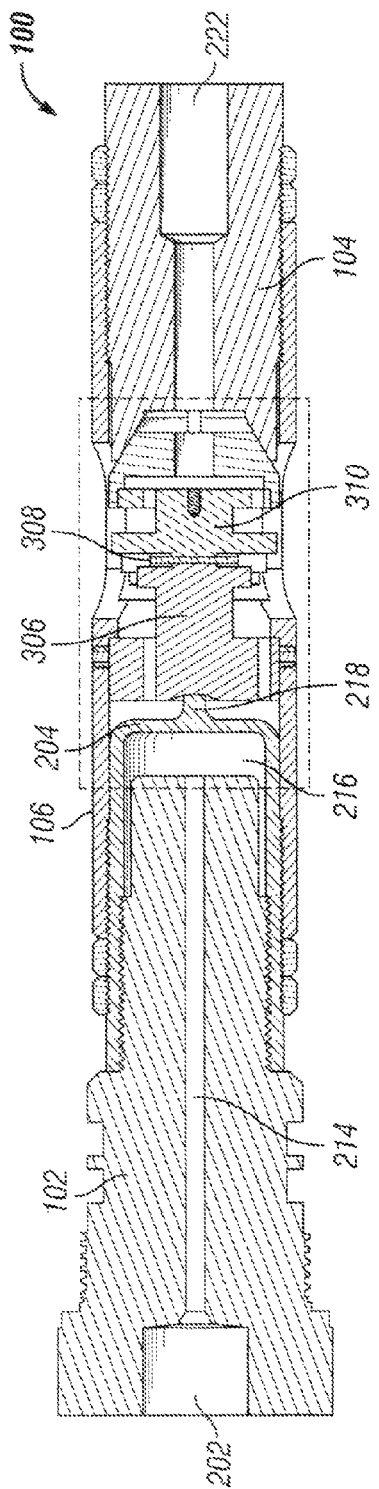
FIG. 3A illustrates a longitudinal cross-section of the pressure sensor of FIG. 1 in accordance with another example embodiment.
Figure 3B:
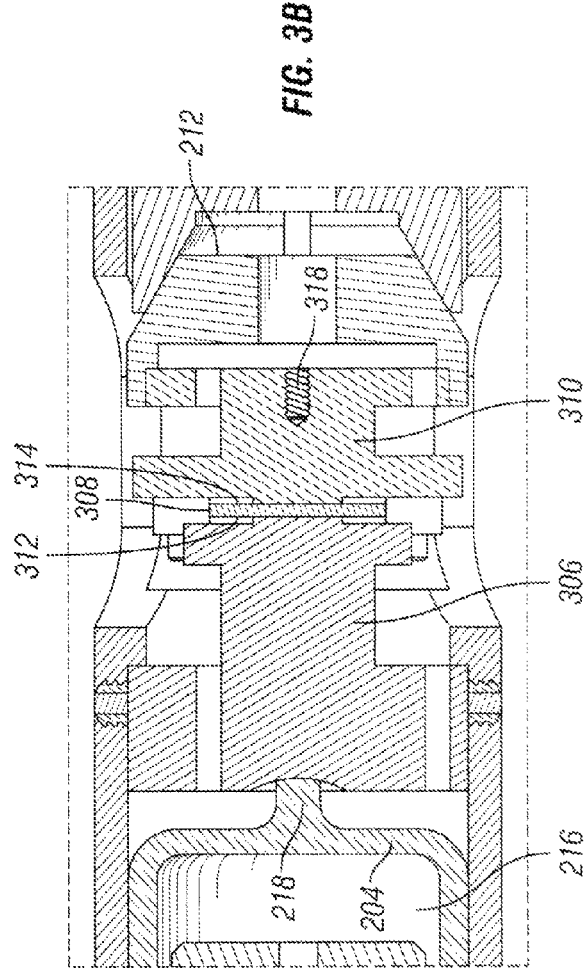
FIG. 3B illustrates a close-up view of a portion of the longitudinal cross-section illustrated in FIG. 3A in accordance with an example embodiment.

Referring to FIGS. 3A and 3B, FIG. 3A illustrates a longitudinal cross-section of the pressure sensor 100 of FIG. 1 in accordance with another example embodiment. FIG. 3B illustrates a close-up view of a portion of the longitudinal cross-section illustrated in FIG. 3A in accordance with an example embodiment. The pressure sensor 100 of FIG. 3A is substantially similar to the pressure sensor 100 of FIG. 2A and operates in substantially the same manner described with respect to the pressure sensor 100 of FIG. 2A. For the sake of brevity, some components of the pressure sensor 100 described with respect to FIGS. 2A and 2B are not repeated here with respect to FIGS. 3A and 3B.

In FIGS. 3A and 3B, a first diaphragm flexure 306 is in contact with a resonator 308 on one side of the resonator 208. In contrast to the resonator 208, the resonator 308 may be a relatively low frequency resonator, such as a ceramic resonator. As an illustrative example, the resonator 308 may be a low-frequency, rectangular transverse/length mode ceramic resonator. Similar to the resonator 208, the diaphragm flexure 306 may be in electrical contact with a terminal of the resonator 308. Similarly, a second diaphragm flexure 310 may be in electrical contact with the opposite terminal of the resonator 308. In contrast to the diaphragm flexure 206 and the diaphragm flexure 210 of FIGS. 2A and 2B, the middle portions of the diaphragm flexure 306 and the diaphragm flexure 310 of FIGS. 3A and 3B are in contact with the respective middle portions 312 and 314 of the resonator 308.

Similar to the operation of the diaphragm flexure 206, resonator 208, and the diaphragm flexure 210, the flexure separator 204 exerts the imparted force on the diaphragm flexure 306, and the diaphragm flexure 306 exerts a load, which is a portion of the imparted force, on the resonator 308. As explained above, the imparted force is proportional to the fluid pressure exerted on the diaphragm separator 204. Similar to the diaphragm flexure 210, the diaphragm flexure 310 exerts a counter force on the resonator 308 and helps maintain the physical integrity of the resonator 308. In some example embodiments, when the fluid pressure exerted on the diaphragm separator 204 is approximately 5000 PSI, the pressure due to the imparted force exerted by the diaphragm separator 204 on the diaphragm flexure 306 is approximately 311 PSI. In turn, the load applied on the resonator 308 by the diaphragm flexure 306 is approximately 38 PSI. The amount of load exerted on the resonator 308 may depend on the thicknesses of the diaphragm separator 204, the diaphragm flexure 306, and the diaphragm flexure 310.

Figure 4:
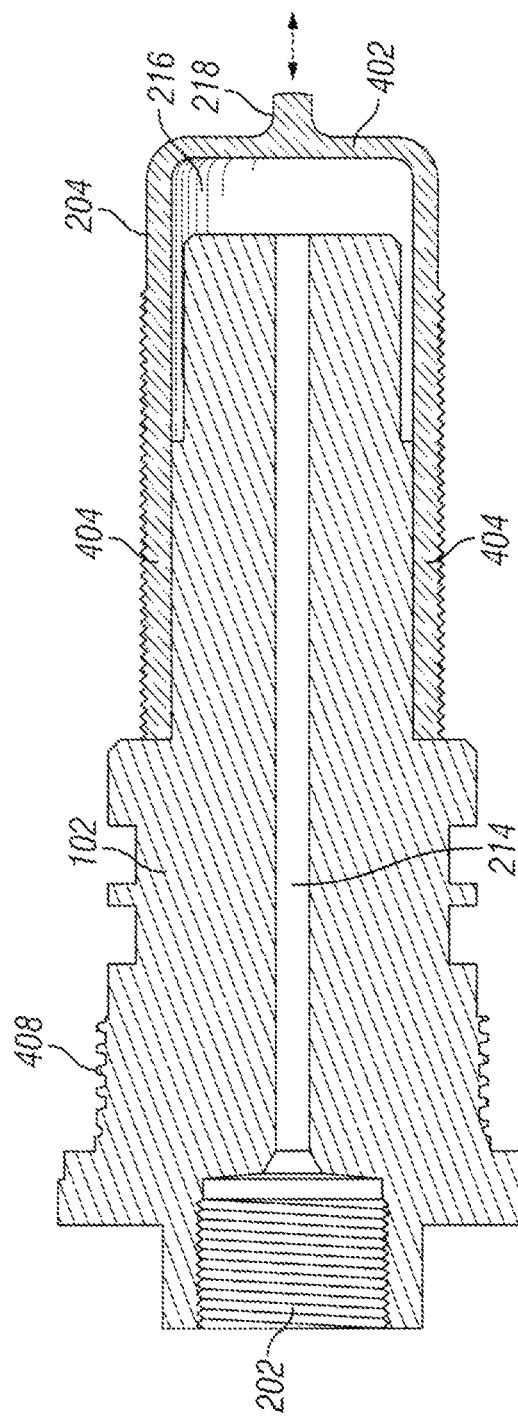
FIG. 4 illustrates a cross-section of a diaphragm separator and a pressure head of the pressure sensor of FIG. 1 in accordance with an example embodiment.

FIG. 4 illustrates a cross-section of a diaphragm separator 204 and a pressure head 102 of the pressure sensor of FIG. 1 in accordance with an example embodiment. The pressure head 102 may have a threaded portion 408 that may be used to attach an outer housing (not shown) to the pressure head 102 such that a substantial portion of the pressure sensor 100 is enclosed within the outer housing. As illustrated in FIG. 4, the channel 214 extends between the fluid inlet 202 and the chamber 216. With the exception of the channel 214, the chamber 216 is bounded by the pressure head 102 and the diaphragm separator 204. As explained above, the chamber 216 may contain an isolation fluid that is isolated from the outside fluid that is monitored for pressure. Alternatively, the chamber 216 may contain the outside fluid as explained above.

In some example embodiments, the diaphragm separator 204 includes an end wall 402 and a side wall 404. To illustrate, the end wall 402 may be designed to move toward a diaphragm flexure, such as the diaphragm flexure 206 shown of FIGS. 2A and 3A, in response to the fluid pressure exerted by the fluid contained in the chamber 216. The protrusion 218 extending out from the end wall 402 may also move laterally along with the end wall 402 in response to the fluid pressure exerted by the fluid contained in the chamber 216. In some alternative embodiments, the protrusion 218 may be omitted and a portion of the end wall 218 may be in contact with the diaphragm flexure 206, another diaphragm flexure, or a resonator such as the resonator 208 illustrated, for example, in FIGS. 2A and 3A or the resonator 308 shown in FIGS. 2A and 3A.

In some example embodiments, the force imparted to a diaphragm flexure, such as the diaphragm flexure 206 shown of FIGS. 2A and 3A, by the diaphragm separator 204 may depend on the thickness of the end wall 402. As an illustrative example, the end wall 402 may have a thickness of $1/16^{th}$ of an inch. In some example embodiments, a $1/16^{th}$ of an inch thickness of the end wall 402 may be used in sensing up to 3000 PSI of fluid pressure exerted by the outside fluid. As another illustrative example, the end wall 402 may have a thickness of $3/16^{th}$ of an inch. In some example embodiments, a $3/16^{th}$ of an inch thickness of the end wall 402 may be used in sensing up to 5000 PSI of fluid pressure exerted by the outside fluid. Generally, a larger thickness of the end wall 402 may result in a weaker force being imparted by the diaphragm separator 204 to the diaphragm flexure 206.

Figure 5B:
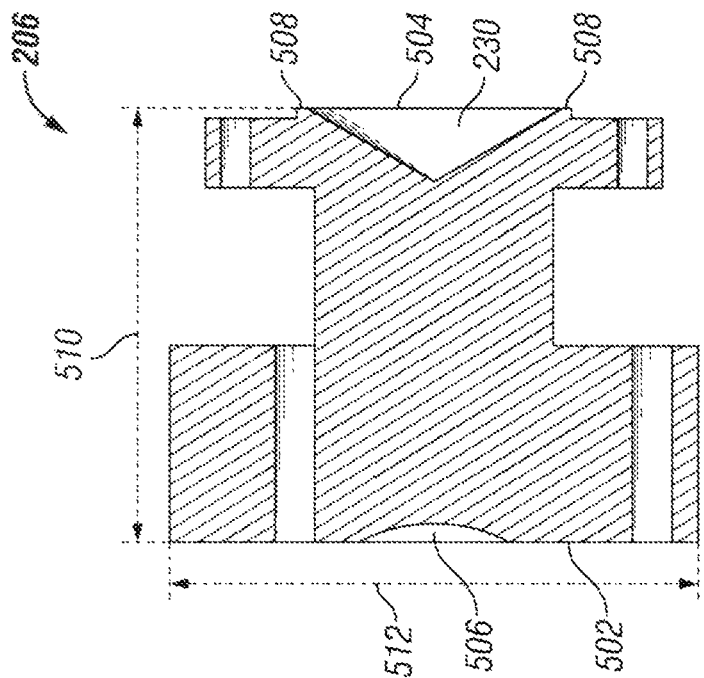
FIGS. 5A and 5B illustrate views of a front diaphragm flexure illustrated in FIGS. 2A and 2B in accordance with an example embodiment.
Figure 5A:
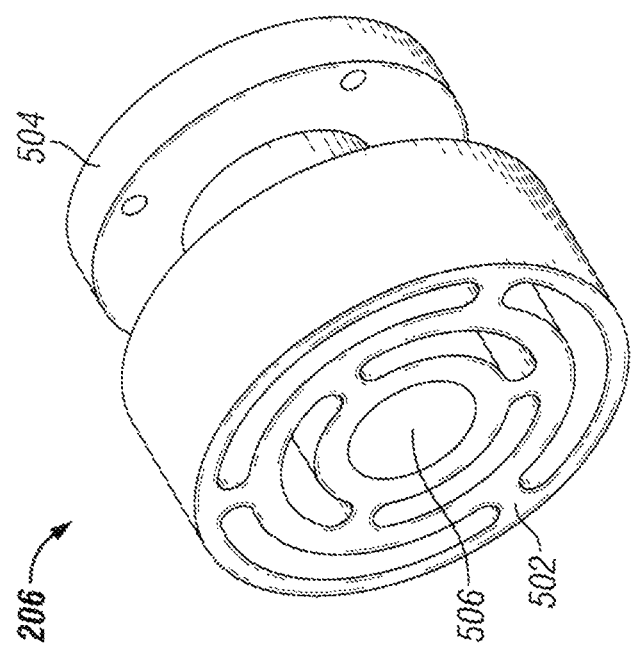

FIGS. 5A and 5B illustrate views of the first (front) diaphragm flexure 206 illustrated in FIGS. 2A and 2B in accordance with an example embodiment. As illustrated in FIGS. 5A and 5B, the diaphragm flexure 206 includes a first side 502 that is shown facing the diaphragm separator 204 in FIGS. 2A and 2B. The diaphragm flexure 206 includes an opening 506 on the first side 502. The opening 506 is designed to receive the protrusion 218 of the diaphragm separator 204. The edge portions 508 of the diaphragm flexure 206 on the second side 504 are designed to be in contact with the edge portions 224 of the resonator 208 as shown in FIG. 2B. As explained above, the space 230 provides room for lateral movement of middle portions of the resonator 208 and the diaphragm flexure 206. In some example embodiments, the length of the diaphragm flexure 206 shown by the dotted arrow 510 is approximately 0.55 inches, and the height of the diaphragm flexure 206 shown by the dotted arrow 512 is approximately 0.8 inches.

Figure 6B:
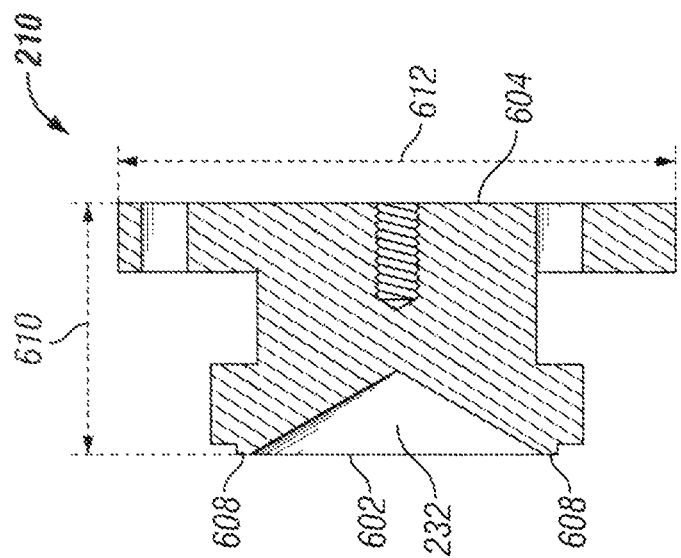
FIGS. 6A and 6B illustrate views of a rear diaphragm flexure illustrated in FIGS. 2A and 2B in accordance with an example embodiment.
Figure 6A:
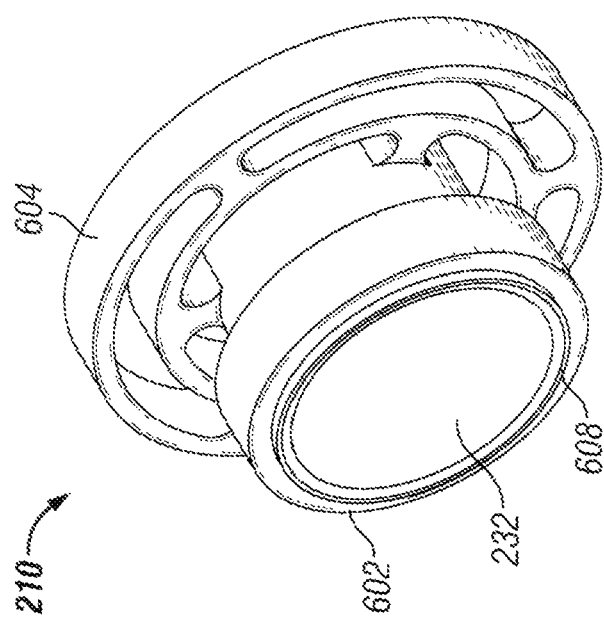

FIGS. 6A and 6B illustrate views of a second (rear) diaphragm flexure 210 illustrated in FIGS. 2A and 2B in accordance with an example embodiment. As illustrated in FIGS. 6A and 6B, the diaphragm flexure 210 includes edge portion 608 on a first side 602 of the diaphragm flexure 210 facing the resonator 208 shown in FIGS. 2A and 2B. The edge portion 608 is designed to be in contact with the edge portions 226 of the resonator 208. The space 232 provides room for lateral movement of middle portions of the resonator 208 and the diaphragm flexure 210. In some example embodiments, the length of the diaphragm flexure 210 shown by the dotted arrow 610 is approximately 0.33 inches, and the height of the diaphragm flexure 210 shown by the dotted arrow 612 is approximately 0.75 inches.

Figure 7B:
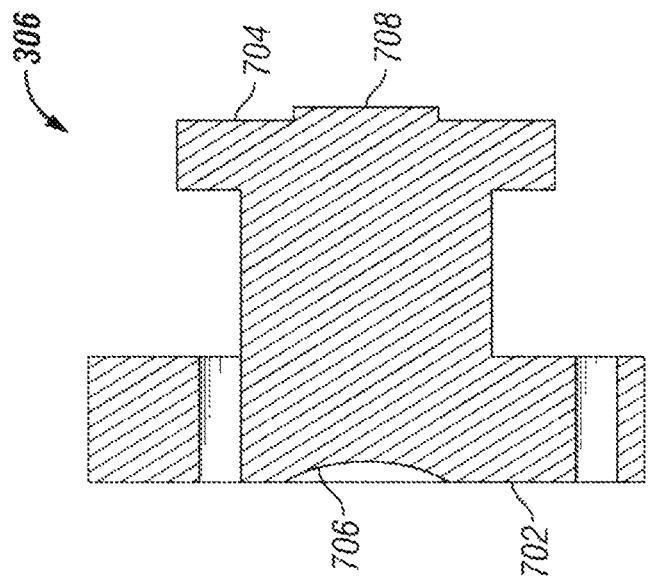
FIGS. 7A and 7B illustrate views of a front diaphragm flexure illustrated in FIG. 3A in accordance with an example embodiment.
Figure 7A:
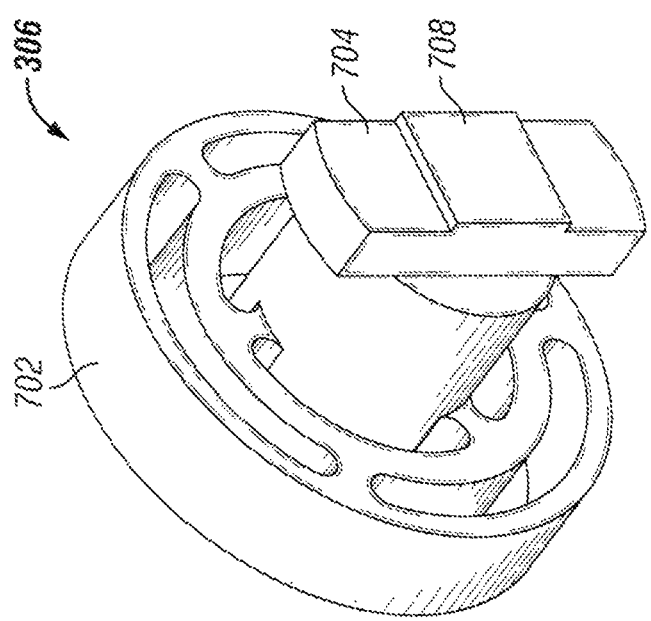

7A and 7B illustrate views of a first (front) diaphragm flexure 306 illustrated in FIGS. 3A and 3B in accordance with an example embodiment. As illustrated in FIGS. 7A and 7B, the diaphragm flexure 306 includes a first side 702 that faces the diaphragm separator 204 in FIGS. 3A and 3B. The diaphragm flexure 306 includes an opening 706 on the first side 702. The opening 706 is designed to receive the protrusion 218 of the diaphragm separator 204. A middle portion 508 on a second side 704 of the diaphragm flexure 306 is designed to be in contact with the middle portion 312 of the resonator 308 as shown in FIG. 3B. The diaphragm flexure 306 may have similar dimensions as the diaphragm flexure 206 of FIGS. 5A and 5B.

Figure 8:
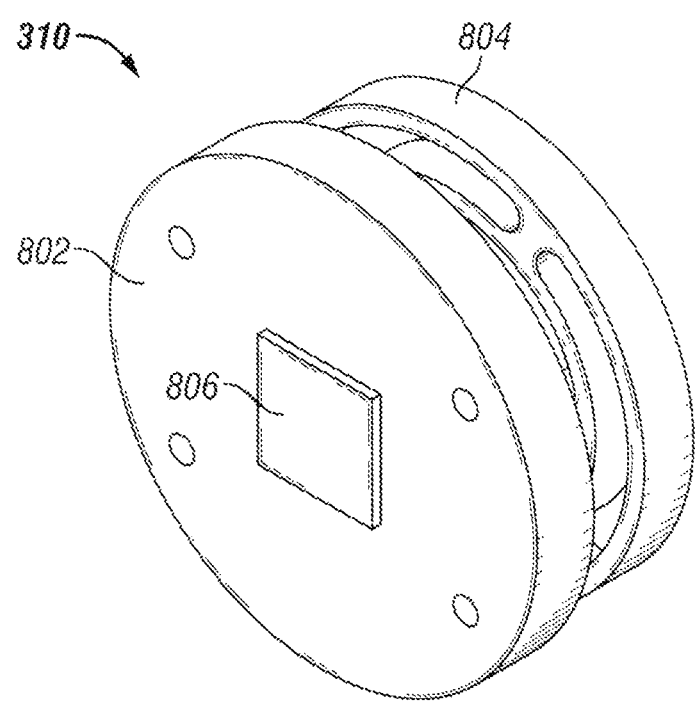
FIG. 8 illustrates a rear diaphragm flexure illustrated in FIG. 3A in accordance with an example embodiment.

FIG. 8 illustrates a second (rear) diaphragm flexure 310 illustrated in FIGS. 3A and 3B in accordance with an example embodiment. The first side 802 of the diaphragm flexure 310 includes a middle portion 806 that is designed to be in contact with the middle portion 314 of the resonator 308 as shown in FIG. 3B. A second side 804 of the diaphragm flexure 310 is shown facing the isolator 212 in FIG. 3B. The diaphragm flexure 306 may have similar dimensions as the diaphragm flexure 210 of FIGS. 6A and 6B.

Figure 9A:
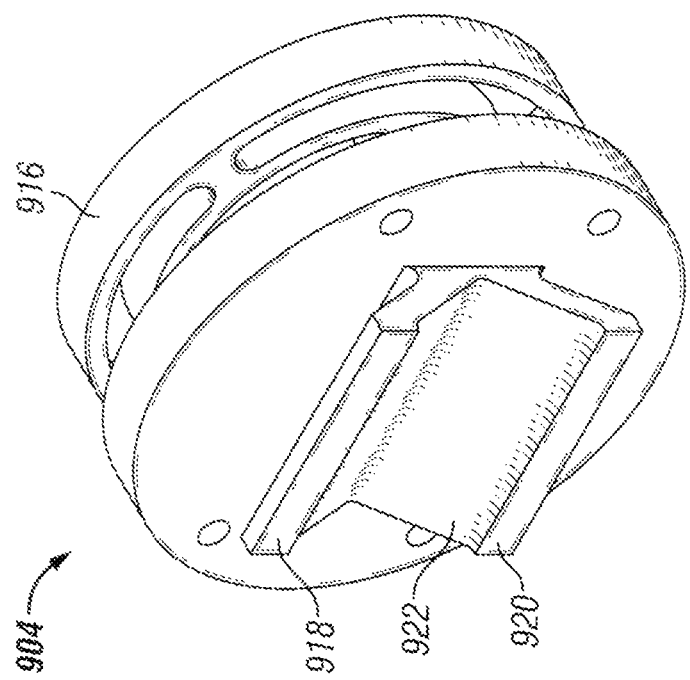
FIGS. 9A and 9B illustrate a front diaphragm flexure and a rear diaphragm flexure, respectively, in accordance with other example embodiments.
Figure 9B:
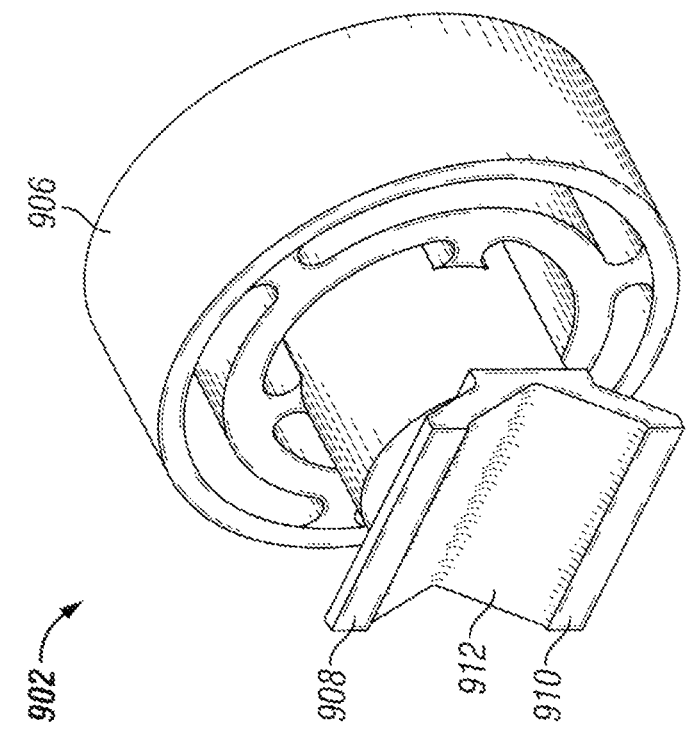

FIGS. 9A and 9B illustrate a first (front) diaphragm flexure 902 and a second (rear) diaphragm flexure 904, respectively, in accordance with other example embodiments. In some example embodiments, the pressure sensor 100 of FIG. 2A may include the diaphragm flexure 902 instead of the diaphragm flexure 206 of FIGS. 5A and 5B. For example, the first side 906 may include an opening similar to the opening 506 of the diaphragm flexure 206. Segments 908 and 910 of the diaphragm flexure 902 may be positioned on respective edge portions 224 of the resonator 208 of FIG. 2B. For example, the space 912 corresponds to the space 230 shown in FIG. 2B and provides room for the middle portions of the resonator 208 and the diaphragm flexure 902 to move laterally. Similarly, in some example embodiments, the pressure sensor 100 of FIG. 2A may include the diaphragm flexure 904 instead of the diaphragm flexure 210 of FIGS. 6A and 6B. Segments 918 and 920 may be in contact with the edge portions 226 of the resonator 208 shown in FIG. 2B. Further, the space 922 may correspond to the space 232 shown in FIG. 2B and may provide room for the middle portions of the resonator 208 and the diaphragm flexure 904 to move laterally. The second side 916 of the diaphragm flexure 904 may include an attachment hole similar to the attachment hole 238 shown in FIG. 2B.

Figure 10A:
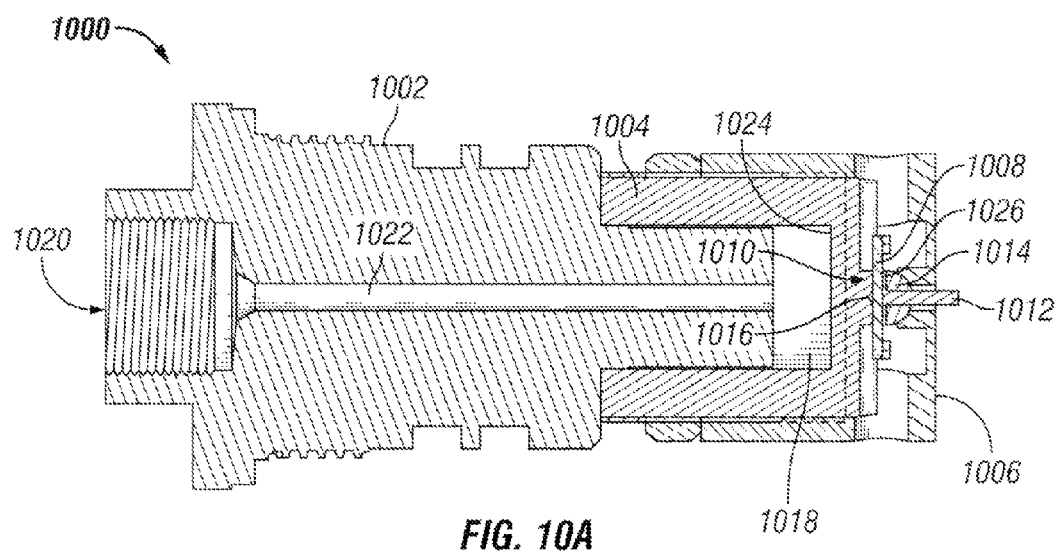
FIGS. 10A and 10B illustrate a pressure sensor for sensing a pressure of a fluid according to another example embodiment.
Figure 10B:
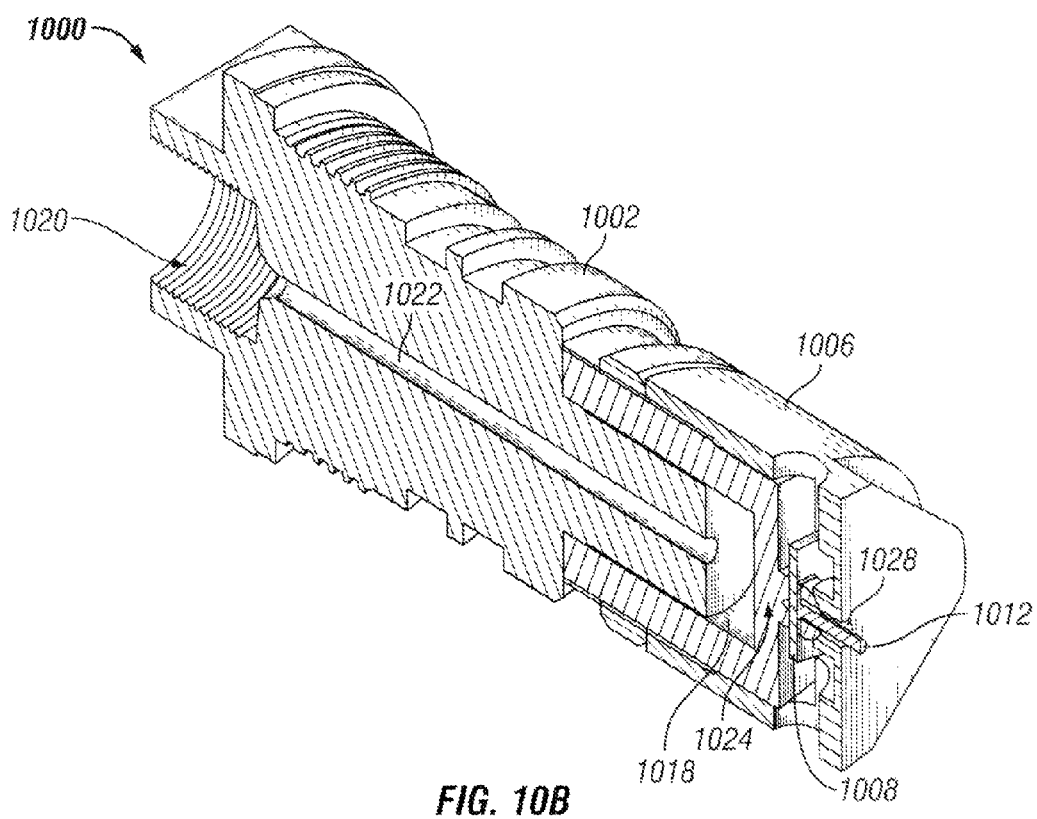

FIGS. 10A and 10B illustrate a pressure sensor 1000 for sensing a pressure of a fluid according to another example embodiment. Similar to the pressure sensor 100, pressure exerted by a fluid ("outside fluid") that is outside of the pressure sensor 1000 may be determined by associating the pressure exerted by the outside fluid to a resonance frequency of a resonator of the pressure sensor 1000. In some example embodiments, the pressure sensor 1000 may be placed in the annulus portion of a well between the casing and the production tubing of a wellbore. The pressure sensor 1000 is configured to sense a wide range of fluid pressure levels over a wide range of temperature conditions. In some example embodiments, the pressure sensor 1000 may operate in an environment having a temperature that ranges from below 32° F. (gas pressure measurements) to over 600 degrees Fahrenheit. The pressure sensor may also sense pressure levels ranging from 0 pound per square inch (PSI) to over 10,000 PSI.

Referring to FIGS. 10A and 10B, the pressure sensor 1000 includes a pressure head 1002, a diaphragm separator 1004, a backing diaphragm 1006, and a resonator 1008. In some example embodiments, the pressure head 1002 and the diaphragm separator 1004 may be threaded to mate with each other. Alternatively, the pressure head 102 and the diaphragm separator 1004 may be securely attached to each other by other means such as fasteners and soldering/brazing/welding.

In some example embodiments, the diaphragm separator 1004 includes a protrusion 1010 extending out from an end wall 1024 of the diaphragm separator 1004 toward the resonator 1008. The protrusion 1010 may be in contact with the resonator 1008 on a first side of the resonator 1008. The protrusion 1010 may also include a void 1016 at a tip portion of the protrusion 1010, where the tip portion of the protrusion is in contact with the resonator 1008. For example, the void 1016 may have a V-shape or another similar shape such that portions of the protrusion 1010 on opposite sides of the void 1016 are in contact with the resonator 1008 on the first side of the resonator 1008. To illustrate, the protrusion 1010 may be in contact with a terminal (e.g., a negative terminal) of the resonator 1008. Because the diaphragm separator 1004 including the protrusion 1010 may be made from an electrically conductive material, the protrusion 1010 may allow for an electrical connection to be made with the first terminal of the resonator 1008.

In some example embodiments, the pressure sensor 1000 includes an electrode 1012 and an insulator 1014. The insulator 1014 electrically isolates the electrode 1012 from the backing diaphragm 1006. For example, the electrode 1012 may have a contact section 1026 that is in contact with the resonator 1008 on a second side of the resonator 1008. For example, the electrode 1012 may also be in contact with a second terminal (e.g., a positive terminal) of the resonator 1008. The electrode 1012 may allow for electrical connection to be made with the second terminal of the resonator 1008. In some example embodiments, the electrode 1012 may be T-shaped, and the top portion of the electrode 1012 may be the contact section 1026.

In some example embodiments, a portion of the electrode 1012 may extend through an opening of the insulator 1014 and through an opening 1028 of the backing diaphragm 1006. For example, the insulator 1014 may be positioned between the backing diaphragm 1006 and the contact section 1026 of the electrode 1012 and may be in contact with both.

In some example embodiments, the pressure head 1002 includes a fluid inlet 1020 and a channel 1022 extending between the fluid inlet 1020 and a chamber 1018. The chamber 1018 is bounded by the diaphragm separator 1024 and the pressure head 1002 with the channel 1022 providing a passageway to the fluid inlet 1020. In some example embodiments, when the pressure sensor 1000 is used to sense the pressure of the outside fluid, the chamber 1018 may contain an isolation fluid that is separated by a structure (for example, a bellows) from the outside fluid. For example, the isolation fluid in the chamber 1018 may be a hydraulic fluid.

The pressure exerted by the outside fluid may be transferred to the isolation fluid contained in the chamber 1018, and the isolation fluid may exert the pressure on the diaphragm separator 1004. For example, the fluid pressure exerted on the diaphragm separator 1004 by the isolation fluid contained in the chamber 1018 may be substantially the same amount of pressure exerted by the outside fluid. In some alternative embodiments, the chamber 1018 may contain the outside fluid instead of the isolation fluid without a separator that isolates the chamber 1018 from the outside fluid.

When the isolation fluid in the chamber 1018 exerts fluid pressure on the diaphragm separator 1004, the diaphragm separator 1004 may impart a force that is proportional to the fluid pressure onto the resonator 1008. In general, the imparted force exerted on the resonator by the diaphragm separator 1004 is fractionally proportional to the fluid pressure exerted on the diaphragm separator 1004 such that the resonator is protected from physical damage due to excessive force.

In some example embodiments, when the fluid pressure exerted by the isolation fluid in the chamber 1018 on the diaphragm separator 1004 increases, the end wall 1024 and the protrusion 1010 may move laterally toward the resonator 1008 such that the protrusion 1010 exerts a proportionally increased imparted force onto the resonator 1008 on the first side of the resonator 1008. When the fluid pressure exerted by the isolation fluid in the chamber 1018 on the diaphragm separator 1004 decreases, the end wall 1024 and the protrusion 1010 may move laterally away from the resonator 1008 such that the protrusion 1010 exerts a proportionally decreased imparted force onto the resonator 1008 on the first side of the resonator 1008. When the diaphragm separator 1004 exerts the imparted force on the resonator 1008 on the first side of the resonator 1008, the backing diaphragm 1006 may exert a counter force onto the resonator 1008 on the second side of the resonator 1008 through the insulator 1014 and the electrode 1012 that is in contact with the second side of the resonator 1008. In some example embodiments, the imparted force exerted on the resonator 1008 may depend on the thickness of the end wall 1024.

In some example embodiments, the fluid inlet 1020 may be coupled to a pipe (e.g., a pipe 1108 shown in FIG. 11) that connects the pressure sensor 1000 to the outside fluid. For example, the pipe may be coupled to an opening in a structure that isolates pressure sensor 1000 from the outside fluid. Alternatively, the pressure sensor 1000 may be enclosed in an outer housing or sleeve (not shown) that protects the pressure sensor 1000 from exposure to the outside fluid even when the pressure sensor 1000 is exposed to the outside fluid.

In some example embodiments, the pipe may contain the same isolation fluid contained in the chamber 1018 and may serve to transfer the pressure from the outside fluid to the isolation fluid in the chamber 1018. For example, the pressure of the outside fluid can be transferred to the isolation fluid in the chamber 1018 through isolation fluid in both the pipe and the channel 1018. Although a single channel and a single fluid inlet are shown in FIGS. 10A and 10B, in alternative embodiments, the pressure head 1002 may include multiple channels and/or multiple fluid inlets. Further, in some alternative embodiments, the pressure head 1002 may include multiple chambers.

To determine the fluid pressure exerted by the outside fluid, a reference resonance frequency of the resonator 1008 may first be determined based on a known amount of fluid pressure exerted by the isolation fluid contained in the chamber 1018, where, for example, the amount of fluid pressure exerted by the isolation fluid is substantially the same as the amount of fluid pressure exerted by the outside fluid. After the reference resonance frequency of the resonator 1008 corresponding to the known amount of fluid pressure is determined, a new resonance frequency of the resonator 1008 resulting from a change in the imparted force exerted on the resonator 1008 may be used to determine the pressure exerted by the fluid contained in the chamber 1018. To illustrate, because the resonance frequency of the resonator 1008 is dependent on the imparted force exerted on the resonator 1008, the proportional relationship between the imparted force and the fluid pressure exerted on the diaphragm separator 1004 by the isolation fluid contained in the chamber 1018 can be used to determine the fluid pressure exerted by the outside fluid based on the new resonance frequency of the resonator 1008.

In some example embodiments, the diaphragm separator 1004, the backing diaphragm 1006, and the electrode 1012 may be made from steel, such as stainless steel, or from another electrically conductive material. In some example embodiments, the resonator 1008 may be a quartz resonator, such as a high frequency, thickness-shear-mode disc quartz resonator.

By using metal and ceramic components and by eliminating the placement of active electronic components within the pressure sensor 1000, the pressure sensor 1000 allows pressure sensing to be performed, for example, in relatively high temperature environments. Further, the pressure sensor 1000 may be produced more cost effectively than pressure sensors that include generally more costly active components.

FIG. 11 illustrates a system 1100 for measuring a pressure of a fluid using the pressure sensor of FIG. 1 in accordance with an example embodiment. The system 1100 includes a network analyzer 1102 and the pressure sensor 100. In an example embodiment, the network analyzer 1102 includes a signal source that generates a signal and a signal receiver that receives a signal. For example, the network analyzer 1102 may output a signal via the first port 1110 and may receive a signal via the second port 1112. Alternatively, the network analyzer 1102 may output a signal via the second port 1112 and may receive a signal via the first port 1110. To illustrate, the first port 1110 and the second port 1112 may be electrically coupled to the resonator 208, 308 of the pressure sensor 100. For example, the first port 1110 may be electrically coupled to the resonator 208, 308 through the passageway 222 in the backing plug 104 shown in FIGS. 2A and 3A. In alternative embodiments, the first port 1110 may be coupled to the resonator 208, 308 without using the passageway 222 of the backing plug 104.

In some example embodiments, the first port 1110 may be electrically coupled to a terminal of the resonator 208, 308 of the pressure sensor 100 via an electrical connection 1104. Similarly, the second port 1112 of the network analyzer 1102 may be electrically coupled to another terminal of the resonator 208, 308 via an electrical connection 1106. In some example embodiments, the electrical connection 1104 may include a production tubing of an oil well, and the electrical connection 1106 may include a casing of the oil well. For example, the casing of the oil well may be electrically connected to the housing 106 of the pressure sensor 100 when the pressure sensor 100 is positioned in the annulus between the casing and the production tubing.

In some example embodiments, the network analyzer 1102 may send a signal to the resonator 208, 308 via the electrical connection 1106 and may receive the signal from the resonator 208, 308 via the electrical connection 1104. In some alternative embodiments, the network analyzer 1102 may send a signal to the resonator 208, 308 via the electrical connection 1104 and may receive the signal from the resonator 208, 308 via the electrical connection 1106. The network analyzer 1102 may vary the frequency of the signal provided to the resonator 208, 308 to sweep through a range of frequencies to determine the resonance frequency of the resonator 208, 308, which is indicative of the pressure sensed by the pressure sensor 100.

To illustrate, as explained above, the resonance frequency of the resonator 208, 308 of the pressure sensor 100 depends on the pressure/load applied to the resonator 208, 308. By determining a reference resonance frequency of the resonator 208, 308 that corresponds to a reference fluid pressure of the outside fluid that is monitored for pressure, changes in the fluid pressure of the outside fluid may be determined by determining changes in the resonance frequency of the resonator 208, 308. The amount of change in the fluid pressure may be determined based on the particular resonance frequency relative to the reference resonance frequency. In some example embodiments, the pressure sensor 100 may be connected to the outside fluid to be monitored for pressure via the pipe 1108.

By performing a frequency sweep (i.e., by varying the frequency) of the signal generated by the network analyzer 1104 and processing the signal received by the network analyzer 1104 through the pressure sensor 100 (i.e., through the resonator 208, 308), the resonance frequency that is indicative of the fluid pressure may be determined. The resonance frequency of the resonator 208, 308 may be determined by processing the signal, after the signal is received by the network analyzer 1102, to determine one or more parameters, such as voltage level, power, and/or frequency of the signal.

In an example embodiment, the network analyzer 1102 can process the signal received through the pressure sensor 100 to determine one or more parameters and to further determine the pressure sensed by the pressure sensor 100 based on the one or more parameters. Alternatively, the network analyzer 1102 may determine the one or more parameters of the signal and pass the parameter(s) and/or other information to another device to determine the pressure of a fluid sensed by the pressure sensor 100. Those of skill in the art will appreciate that a conventional computing device comprising one or more processors and one or more memories may be included in or operate with the network analyzer 1102. Network analyzer 1102 may also include communications modules for wired or wireless communications with other local or remote computing devices.

In some alternative embodiments, instead of the network analyzer 1102, separate signal source and signal receiver may be used to send and receive the signal to/from the pressure sensor 100. Further, in some embodiments, the connection 1106 may be at an electrical ground potential and may be coupled to an electrical ground.

Although the system 1100 is described above with respect to the pressure sensor 100, in some example embodiments, the system 1100 may include the pressure sensor 1000 of FIGS. 10A and 10B instead of the pressure sensor 100 and may operate in substantially the same manner described above without departing from the scope of this disclosure. For example, the electrical connection 1104 may be electrically coupled to the electrode 1012, and the electrical connection 1106 may be coupled to the diaphragm separator 1004 that is in electrical communication with the first terminal of the resonator 1008 of the pressure sensor 1000 as described above.

Figure 12:
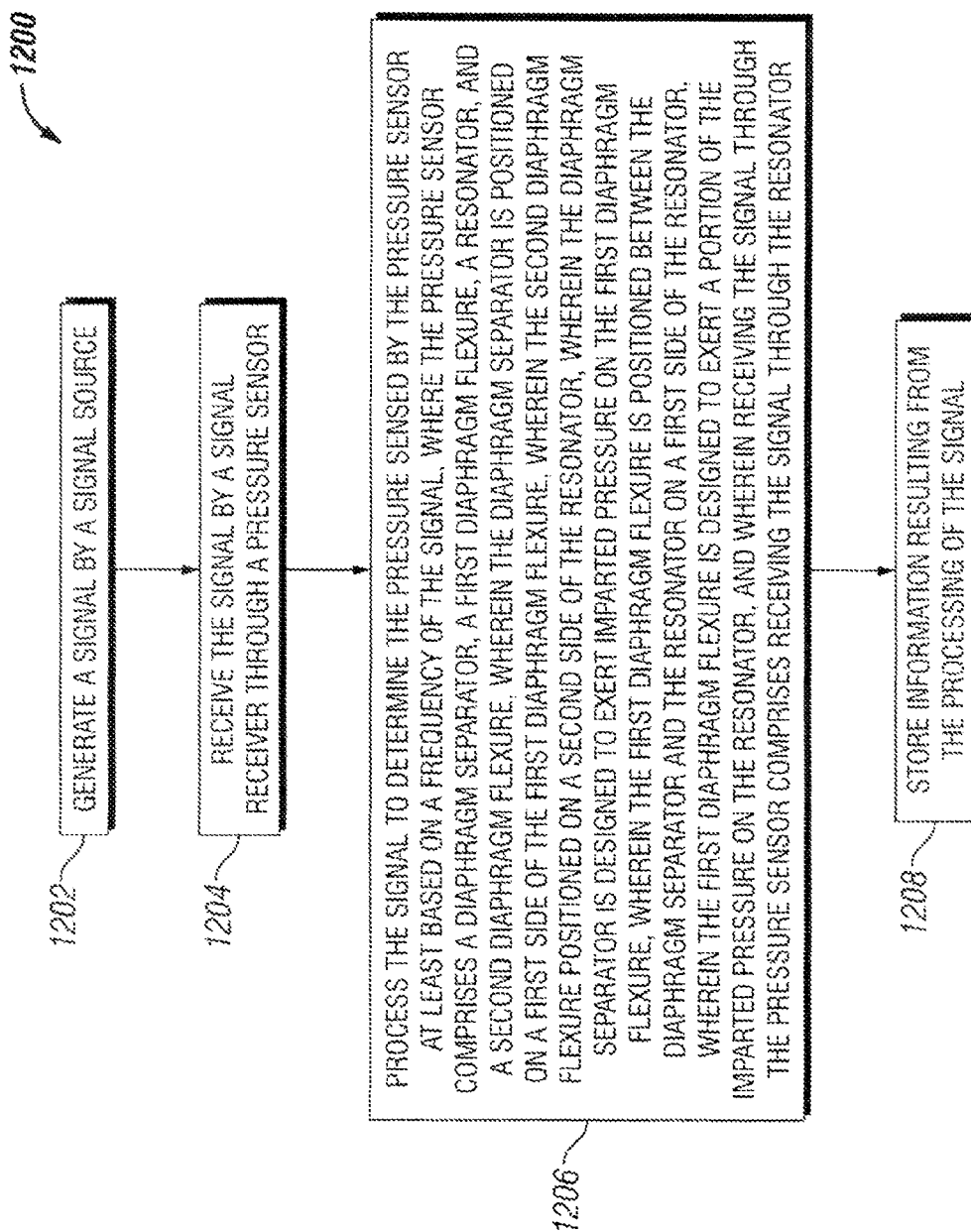
FIG. 12 illustrates a method for measuring a pressure of a fluid in accordance with an example embodiment.

FIG. 12 illustrates a method 1200 for measuring a pressure of a fluid in accordance with an example embodiment. The method 1200 includes generating a signal by a signal source, at 1202. For example, the network analyzer 1102 of FIG. 11 may generate a signal that is provided to a resonator (e.g., the resonator 208 of FIG. 2A or the resonator 308 of FIG. 3A) of the pressure sensor 100 of FIG. 1 or to the resonator 1008 of the pressure sensor 1000 of FIGS. 10A and 10B. The method 1200 also includes receiving the signal by a signal receiver through a pressure sensor, at 1204. For example, the network analyzer 1102 may receive the signal through the pressure sensor 100 or the pressure sensor 1000. To illustrate, the network analyzer 1102 may receive the signal through the resonator 208, 308 illustrated in FIGS. 2A and 3A, respectively, or through the resonator 1008 shown in FIGS. 10A and 10B.

The method 1200 further includes processing the signal to determine the pressure sensed by the pressure sensor, at 1106. For example, the network analyzer 1102 of FIG. 1100 may process the signal received through the resonator 208, 308 to determine the pressure sensed by the pressure sensor 100 or received through the resonator 1008 to determine the pressure sensed by the pressure sensor 1000. For example, processing the signal to determine the pressure sensed by the pressure sensor may include determining one or more parameters of the signal, such as the voltage level, power, and/or frequency of the signal at one or both of the signal source and the signal receiver. To illustrate, processing the signal may include determining a voltage level of the signal after the signal is received by the signal receiver. In some example embodiments, the method 1200 also includes varying a frequency of the signal by the signal source to determine the resonance frequency of the resonator of the pressure sensor 100 or the resonator of the pressure sensor 1000. For example, the pressure sensed by the pressure sensor 100 can be determined based on the frequency of the signal, which may correspond to the pressure sensed by the pressure sensor 100 when the frequency of the signal matches the resonant frequency of the resonator 208, 308 of the pressure sensor 100, as described above. Similarly, the pressure sensed by the pressure sensor 1000 can be determined based on the frequency of the signal, which may correspond to the pressure sensed by the pressure sensor 1000 when the frequency of the signal matches the resonant frequency of the resonator 1008 of the pressure sensor 1000, as described above.

At 1208, the method 1200 concludes with storing the information resulting from the processing. For example, the information may be stored in a memory, such as a static random access memory.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A pressure sensor for sensing pressure of a fluid, the pressure sensor comprising:
   a diaphragm separator having a protrusion;
   a resonator, wherein the protrusion is in contact with the resonator on a first side of the resonator and wherein the protrusion is positioned to exert an imparted force onto the resonator and wherein the protrusion is in contact with and makes an electrical connection to a first terminal of the resonator; and
   a backing diaphragm positioned on a second side of the resonator, wherein the backing diaphragm exerts a counter force onto the resonator in response to the imparted force.

2. The pressure sensor of claim 1, wherein the protrusion of the diaphragm separator has a V-shaped void at a tip portion of the protrusion and wherein the tip portion of the protrusion is in contact with the resonator.

3. The pressure sensor of claim 1, wherein an end wall of the diaphragm separator moves toward the resonator in response to an increase in fluid pressure exerted on the end wall of the diaphragm separator and wherein the resonator oscillates at a resonant frequency in response to the imparted force, and wherein the imparted force is proportional to the fluid pressure.

4. The pressure sensor of claim 3, further comprising a chamber partially bounded by the diaphragm separator, wherein the fluid pressure is exerted by a fluid contained in the chamber and wherein the fluid is isolated from the resonator.

5. The pressure sensor of claim 4, further comprising a pressure head having a fluid inlet and a channel, wherein the channel extends between the fluid inlet and the chamber.

6. The pressure sensor of claim 4, wherein the fluid is a hydraulic fluid separated from an outside fluid that exerts external fluid pressure that transferred to hydraulic fluid.

7. The pressure sensor of claim 1, further comprising an electrode, wherein the electrode is in contact with a second terminal of the resonator.

8. The pressure sensor of claim 7, further comprising an insulator electrically isolating the electrode from the backing diaphragm, wherein a portion of the electrode extends through an opening of the insulator and through an opening of the backing diaphragm.

9. The pressure sensor of claim 7, wherein the electrode is T-shaped and wherein a top portion of the electrode is in contact with resonator.

10. The pressure sensor of claim 1, wherein the backing diaphragm is fixedly attached to the diaphragm separator such that the resonator is substantially enclosed by the diaphragm separator and the backing diaphragm.

11. The pressure sensor of claim 1, wherein a magnitude of the imparted force depends on a thickness of the end wall of the diaphragm separator.

12. A system for measuring a pressure of a fluid, the system comprising:
    a signal source;
    a signal receiver; and
    a pressure sensor comprising:
      a diaphragm separator having a protrusion;
      a resonator, wherein the protrusion is in contact with the resonator on a first side of the resonator and wherein the protrusion is positioned to exert an imparted force onto the resonator and wherein the protrusion is in contact with and makes an electrical connection to a first terminal of the resonator; and
      a backing diaphragm positioned on a second side of the resonator, wherein the backing diaphragm exerts a counter force onto the resonator in response to the imparted force.

13. The system of claim 12, wherein an electrode extending through an opening of the backing diaphragm flexure is coupled to a second terminal of the resonator on the second side of the resonator.

14. The system of claim 13, wherein the protrusion of the diaphragm separator has a V-shaped void at a tip portion of the protrusion, wherein the tip portion of the protrusion is in contact with the resonator, wherein the electrode is T-shaped, and wherein a top portion of the electrode is in contact with resonator.

15. The system of claim 12, wherein the resonator is a ceramic resonator and wherein the signal source is configured to vary a frequency of a signal provided to the resonator.

16. The system of claim 12, wherein the pressure sensor further comprises a chamber partially bounded by the diaphragm separator, wherein a fluid pressure is exerted on to the diaphragm separator by a fluid contained in the chamber, wherein the fluid is isolated from the resonator.

17. A method for measuring a pressure of a fluid, the method comprising:
   generating a signal by a signal source;
   receiving the signal by a signal receiver through a pressure sensor; and
   processing the signal to determine the pressure sensed by the pressure sensor, the pressure sensor comprising:
   a diaphragm separator having a protrusion;
   a resonator, wherein the protrusion is in contact with the resonator on a first side of the resonator and wherein the protrusion is positioned to exert an imparted force onto the resonator and wherein the protrusion is in contact with and makes an electrical connection to a first terminal of the resonator; and
   a backing diaphragm positioned on a second side of the resonator, wherein the backing diaphragm exerts a counter force onto the resonator in response to the imparted force and wherein receiving the signal through the pressure sensor comprises receiving the signal through the resonator.

18. The method of claim 17, wherein the pressure sensor further comprises a chamber at least partially bounded by the diaphragm separator, wherein a fluid pressure is exerted by a fluid contained in the chamber, wherein the fluid is isolated from the resonator and the backing diaphragm wherein the imparted force is proportional to the fluid pressure.

19. The method of claim 17, further comprising varying a frequency of the signal by the signal source.

20. The method of claim 19, wherein processing the signal includes determining a voltage level of the signal after the signal is received by the signal receiver.

\* \* \* \* \*